Patented Apr. 3, 1945

2,372,980

UNITED STATES PATENT OFFICE 2,372,980

CELLULOSE DERIVATIVE COMPOSITION

Frank E. Piech, Sayreville, N. J., assignor to Hercules Powder Company, Wilmington, Del., a corporation of Delaware No Drawing. Application November 26, 1942, Serial No. 467,059

10 Claims. (Cl. 106—179)

This invention relates to compositions of matter in which the cellulose mixed esters are combined with other substances, such as compatible plasticizers, and more particularly to compositions of matter in which cellulose mixed esters are combined with certain phenoxy ethanols.

It is well known that in the production of sheets, films, plastics, varnishes, lacquers, etc., it is necessary to combine or mix the cellulose mixed esters with certain plasticizers in order to obtain products of desirable flexibility, hardness, etc. There are a large number of desirable plasticizers for the purpose of plasticizing cellulose mixed ester compositions but many of them are expensive and not obtainable under wartime conditions. Dibutyl phthalate, for example, has been found particularly desirable as a plasticizer for cellulose mixed esters but a relatively large amount of it is required to plasticize properly and the material is not always obtainable.

Now, in accordance with the present invention, it has been discovered that cellulose mixed esters may be desirably plasticized by the use of para-tertiary alkyl phenoxy ethanols. In this manner, these phenoxy ethanols may be substituted for a part or all of the plasticizer ordinarily used.

The following are examples of methods of carrying out this invention:

EXAMPLE 1

Eighty parts of cellulose acetopropionate having a propionyl content of about 31% and an acetyl content of about 17% were colloided with 20 parts of para-tertiary amyl phenoxy ethanol. The composition was cast in sheets which were flexible and tough. The composition had a hardness Rockwell M of 52 and a flow temperature of 137.5° C.

Other compositions were made up with the results indicated in the following tables:

Table 1

|  | Formula | | | |
|---|---|---|---|---|
|  | 1 | 2 | 3 | 4 |
| Cellulose acetopropionate (31% propionyl, 17% acetyl, 300 cps. in 10% acetone solution) | 85 | 80 | 85 | 80 |
| P-tertiary amyl phenoxy ethanol | 15 |  |  |  |
| P-tertiary butyl phenoxy ethanol |  | 20 | 15 |  |
| P-tertiary butyl phenoxy ethyl acetate |  |  |  | 20 |
| Hardness, Rockwell M | 69 | 62 | 75 | 63 |
| Flow temperature, °C | 144 | 135.5 | 142 | 143 |

Table 2

|  | Formula | | | | |
|---|---|---|---|---|---|
|  | 5 | 6 | 7 | 8 | 9 |
| Cellulose acetobutyrate (35% butyryl, 14% acetyl, 300 cps. in 10% acetone solution) | 80 | 85 | 90 | 90 | 85 |
| P-tertiary amyl phenoxy ethanol | 20 | 15 | 10 |  |  |
| P-tertiary butyl phenoxy ethanol |  |  |  | 10 |  |
| P-tertiary butyl phenoxy ethyl acetate |  |  |  |  | 15 |
| Hardness, Rockwell M | 21 | 36 | 42 | 33 | 26 |
| Flow temperature, °C | 122 | 134 | 143 | 138 | 131 |

EXAMPLE 2

Eighty parts of cellulose acetate butyrate having an acetyl and butyryl content of 30% and 16%, respectively, were mixed with 15 parts of para-tertiary amyl phenoxy ethanol and 5 parts of dibutyl phthalate. The mixture was colloided with methyl ethyl ketone. The composition was sheeted, cut into molding powder, dried, and molded in the form of a disk. The product had a hardness Rockwell M of 40 and a flow temperature of 125° C.

EXAMPLE 3

Eighty parts of cellulose acetopropionate having an acetyl and propionyl content of 15% and 29%, respectively, were mixed with 15 parts of para-tertiary butyl phenoxy ethanol and 5 parts of dibutyl phthalate. The mixture was colloided with acetone. The composition was sheeted, cut into molding powder, dried, and molded in the form of a disk. The product had a hardness Rockwell M of 49 and a flow temperature of 131° C.

Those para-tertiary alkyl phenoxy ethanols which have been found particularly useful in this invention include para-tertiary amyl phenoxy ethanol, para-tertiary butyl phenoxy ethanol, and the ester para-tertiary butyl phenoxy ethyl acetate.

Various types of plasticizers are known for use with cellulose mixed esters and they may be used with the phenoxy ethanol. Examples of these are dimethyl, diethyl, dibutyl and diamyl phthalates, tricresyl and triphenyl phosphates, ethyl para-toluene sulfonamides, etc.

While the para-tertiary alkyl phenoxy ethanols may be used alone in combination with the mixed ester, highly desirable results are obtained by the addition of a quantity of other plasticizer, particularly solvent plasticizer. The quantities of each may vary over a wide range but a relationship of 1 part of solvent plasticizer, such as dibutyl phthalate, to 3 parts of the phenoxy ethanol have been found highly desirable.

The types of mixed esters which may be used include all of the commercially available types. These include cellulose acetopropionate, cellulose acetobutyrate, cellulose acetocaproate and cellulose acetostearate.

In using cellulose acetopropionate that having a propionyl content of about 31% and an acetyl content of 15 to 19% is most desirable. In using cellulose acetbutyrate that having a butyryl content of from 15 to 36% and an acetyl content of from 13 to 32% is most desirable. Use of a cellulose acetobutyrate containing from 0.05 to 0.40 free OH groups per $C_6$ residue will give best results.

The total percentage of plasticizer to cellulose mixed ester may also be varied widely depending upon the product which is to be manufactured but, in general, a content of from 10 to 60% of plasticizer, based upon total plastic, will be used.

While the invention lies in the use of a para-tertiary alkyl phenoxy ethanol as a plasticizer, other ingredients ordinarily used in such compositions may be added, such as solvents, fillers, pigments, dyes, stabilizers, etc.

The herein-described compositions of matter may be used to form sheets or films or coating compositions including varnishes and lacquers or plastic compositions, such as in electrical insulation.

It will be seen, therefore, that this invention discloses a new and useful composition of matter comprising cellulose mixed esters plasticized with certain para-tertiary alkyl phenoxy ethanols with or without the addition of another solvent plasticizer.

What I claim and desire to protect by Letters Patent is:

1. A plastic composition comprising from about 40% to about 90% by weight of a cellulose mixed ester and from about 60% to about 10% by weight of total plasticizer, said plasticizer containing essentially a compound selected from the group consisting of p-tertiary butyl phenoxy ethanol, p-tertiary amyl phenoxy ethanol and p-tertiary butyl phenoxy ethyl acetate.

2. A plastic composition comprising from about 40% to about 90% by weight of cellulose acetopropionate and from about 60% to about 10% by weight of total plasticizer, said plasticizer containing essentially a compound selected from the group consisting of p-tertiary butyl phenoxy ethanol, p-tertiary amyl phenoxy ethanol and p-tertiary butyl phenoxy ethyl acetate.

3. A plastic composition comprising from about 40% to about 90% by weight of cellulose acetobutyrate and from about 60% to about 10% by weight of total plasticizer, said plasticizer containing essentially a compound selected from the group consisting of p-tertiary butyl phenoxy ethanol, p-tertiary amyl phenoxy ethanol and p-tertiary butyl phenoxy ethyl acetate.

4. A plastic composition comprising from about 40% to about 90% by weight of a cellulose mixed ester and from about 60% to about 10% by weight of total plasticizer, said platicizer containing essentially p-tertiary butyl phenoxy ethanol.

5. A plastic composition comprising from about 40% to about 90% by weight of a cellulose mixed ester and from about 60% to about 10% by weight of total plasticizer, said plasticizer containing essentially p-tertiary amyl phenoxy ethanol.

6. A plastic composition comprising from about 40% to about 90% by weight of a cellulose mixed ester and from about 60% to about 10% by weight of total plasticizer, said plasticizer containing essentially p-tertiary butyl phenoxy ethyl acetate.

7. A plastic composition comprising from about 40% to about 90% by weight of a cellulose mixed ester and from about 60% to about 10% by weight of total plasticizer, said plasticizer consisting essentially of a solvent plasticizer and a compound selected from the group consisting of p-tertiary butyl phenoxy ethanol, p-tertiary amyl phenoxy ethanol and p-tertiary butyl phenoxy ethyl acetate.

8. A plastic composition comprising from about 40% to about 90% by weight of a cellulose mixed ester and from about 60% to about 10% by weight of total plasticizer, said plasticizer consisting essentially of a solvent plasticizer and a compound selected from the group consisting of p-tertiary butyl phenoxy ethanol, p-tertiary amyl phenoxy ethanol and p-tertiary butyl phenoxy ethyl acetate in the weight ratio of about 1:3.

9. A plastic composition comprising from about 40% to about 90% by weight of a cellulose mixed ester, from about 60% to about 10% by weight of total plasticizer, a pigment and a stabilizer, said plasticizer containing essentially a compound selected from the group consisting of p-tertiary butyl phenoxy ethanol, p-tertiary amyl phenoxy ethanol and p-tertiary butyl phenoxy ethyl acetate.

10. A plastic composition comprising from about 40% to about 90% by weight of a cellulose mixed ester, from about 60% to about 10% by weight of total plasticizer and a dye, said plasticizer containing essentially a compound selected from the group consisting of p-tertiary butyl phenoxy ethanol, p-tertiary amyl phenoxy ethanol and p-tertiary butyl phenoxy ethyl acetate.

FRANK E. PIECH.